United States Patent [19]

Paslay et al.

[11] Patent Number: 5,402,677
[45] Date of Patent: Apr. 4, 1995

[54] METHOD OF DETERMINING DRILLSTRING BOTTOM HOLE ASSEMBLY VIBRATIONS

[75] Inventors: Paul R. Paslay, Houston; Yih-Min Jan, Plano, both of Tex.

[73] Assignee: Atlantic Richfield Company, Plano, Tex.

[21] Appl. No.: 200,263

[22] Filed: Feb. 23, 1994

Related U.S. Application Data

[62] Division of Ser. No. 816,993, Jan. 3, 1992, Pat. No. 5,313,829.

[51] Int. Cl.$^6$ .................. E21B 41/00; E21B 47/00
[52] U.S. Cl. .................... 73/151; 166/250; 175/40
[58] Field of Search ............. 73/151, 151.5; 166/250

[56] References Cited

U.S. PATENT DOCUMENTS

| | | | |
|---|---|---|---|
| 4,250,758 | 2/1981 | Pitts, Jr. et al. | 73/151 |
| 4,384,483 | 5/1983 | Dellinger et al. | 73/151 |
| 4,695,957 | 9/1987 | Peltier | 73/151 |
| 4,715,451 | 12/1987 | Bseisu et al. | 73/151 |
| 4,821,563 | 4/1989 | Maron | 73/151 |
| 4,848,144 | 7/1989 | Ho | 73/151 |
| 5,138,875 | 8/1992 | Booer | 73/151 |
| 5,313,829 | 5/1994 | Paslay et al. | 73/151 |

OTHER PUBLICATIONS

Vandiver et al., "Cape Studies of the Bending Vibration and Whirling Motion of Drill Collars," SPE/IADC publication 18652, 1989, pp. 291–304.

Wolf et al., "Field Measurement of Downhole Drilling Vibrations", SPE publication 14330, Sep. 1985, pp. 1–12.

Mitchell et al., "Lateral Vibration: The Key to BHA Failure Analysis", *World Oil*, Mar. 1985, pp. 101–106.

*Primary Examiner*—Hezron E. Williams
*Assistant Examiner*—George M. Dombroske
*Attorney, Agent, or Firm*—Michael E. Martin

[57] ABSTRACT

Lateral vibrations of drillstring bottom hole assemblies are confirmed by sensing longitudinal and torsional accelerations or displacements of the drillstring at or near its top end during rotation and determining the lateral critical speed and displacement of the drillstring from the mode shape of the bottom hole assembly which occurs during forward synchronous whirl and longitudinal shortening of the bottom hole assembly resulting from such whirl. Lateral motion of the bottom hole assembly, while drilling, is estimated based on longitudinal and torsional measurements at the top of the drillstring. Radial displacement of the bottom hole assembly due to impacting of the borehole wall imparts a torsional impulse which, together with considerable radial motion, is repeated each revolution. The lateral or radial motion causes a small axial motion to develop in the bottom hole assembly which results in an axial force on and axial shortening of the drillstring which varies once per revolution.

9 Claims, 3 Drawing Sheets

METHOD OF DETERMINING DRILLSTRING BOTTOM HOLE ASSEMBLY VIBRATIONS

This is a division of application Ser. No. 07/816,993, filed Jan. 3, 1992, now U.S. Pat. No. 5,313,829.

BACKGROUND OF THE INVENTION

1. Field of the Invention

The present invention provides a method for predicting lateral vibrations of the bottom hole assembly of a drillstring due to forward synchronous whirl at critical speeds and including using sensors to measure longitudinal and torsional movement at the top of the drillstring caused by such vibrations.

2. Background

Elongated drillstems or "drillstrings" used in drilling wells and the like often undergo damaging or destructive lateral vibrations of the bottom hole assembly. The bottom hole assembly of a conventional drillstring may comprise a predetermined set of coupled sections of heavy walled drill pipe or drill collars and selected spaced-apart bearing members commonly known as stabilizers. The bottom hole assembly may also comprise certain members such as drilling jars and members including measurement while drilling (MWD) instrumentation. Although the bottom hole assembly is often the stiffest portion of the drillstring, it is also that portion which is subjected to the greatest amount of compressive stress and, being farthest from the surface, is that portion of the drillstring for which vibrations in all modes are the most difficult to detect.

Efforts to analyze and deal with bottom hole assembly vibration are discussed in treatises entitled "Lateral Vibration: The Key to BHA Failure Analysis" by Robert F. Mitchell and Michael B. Allen, World Oil, March 1985, and in SPE papers numbers 14330 entitled "Field Measurements of Downhole Drillstring Vibrations" by S. F. Wolf, et al., September 1985, and SPE/IADC 18652, "Case Studies of the Bending Vibration and Whirling Motion of Drill Collars" by J. K. Vandiver, et al., March 1989. These publications all address the problem of analyzing and dealing with lateral vibration or bending of the bottom hole assembly and present suggested analysis techniques which are correlated with downhole measurement devices.

However, the use of downhole measurement devices is not always available or practical whereas the development of surface measurement devices and techniques for detecting downhole drillstring behavior has proven to be viable as indicated in U.S. Pat. No. 4,715,451 to Bsiesu, et al. and assigned to the assignee of the present invention.

Even with the advanced technique of determining drillstem behavior using the system and method of the '451 patent, the complex vibration signals sensed at the top of a drillstem during drilling operations has presented certain problems in detecting particular vibration modes which may be correlated with actual downhole behavior of the drillstem, particularly the bottom hole assembly (BHA). The terms "bottom hole assembly" and "BHA" are used interchangeably herein. Accordingly, there has been a strongly felt need to develop a method of detecting bottom hole assembly vibration conditions and predicting, for a particular drillstring, when certain unwanted vibrations will occur, such as those due to forward synchronous whirl at lateral critical frequencies or rotational speeds of the bottom hole assembly.

For example, it has been determined that, at a fundamental lateral critical frequency of a bottom hole assembly, when corresponding to the speed of rotation of the drillstem, deflection of the bottom hole assembly will occur which will cause impacting of the borehole wall by the bottom hole assembly components. Although the placement of stabilizers in a bottom hole assembly serves to journal the BHA in the wellbore, there is a slight eccentricity which occurs due to clearance between the stabilizer outside diameter and the borehole wall, nonlinearity of the wellbore and deflection of the bottom hole assembly due to axial loading on the drillstem. A typical bottom hole assembly may have a length of from 200 ft. to 1,000 ft. and the characteristics of each bottom hole assembly will vary substantially due to the make up of the members, such as the drill collars, stabilizers and other elements that may be present in the assembly. In accordance with the present invention, however, a unique method has been developed for determining potentially catastrophic downhole bending conditions of the bottom hole assembly while drilling including analysis of longitudinal and torsional vibrations of the drillstem at the surface.

SUMMARY OF THE INVENTION

The present invention provides a method for determining bottom hole assembly lateral bending vibrations and the like during rotation of an elongated drillstring. In accordance with an important aspect of the present invention, a method is provided for determining lateral vibrations of a bottom hole assembly of a drillstring which would produce forward synchronous whirl of the bottom hole assembly, which whirl may be detected at the surface of the borehole. A preferred detection device for use with the method of the present invention is described in U.S. Pat. No. 4,715,451. The phenomenon known as forward synchronous whirl is discussed in "Mechanical Vibrations", by J. P. Den Hartog, McGraw Hill Book Company, 1960.

In accordance with another important aspect of the present invention, there is provided a unique method for predicting conditions which would develop forward synchronous whirl of a bottom hole assembly for a particular bottom hole assembly configuration, rotational speed of the drillstring and bottom hole assembly and the actual compressive load on the bottom hole assembly resulting from what is known as the "weight on bit" (WOB) or compressive load at the bottom of the drillstring.

In particular, there is provided an improved method which is based on a mechanical model which converts bottom hole assembly lateral vibrations to longitudinal and torsional vibrations measurable at the surface or top of the drillstring. The model simulates the condition of BHA whirling, incorporates the effects of bending due to whirl forces, and determines the shape of the bottom hole assembly during a particular vibration mode. A unique procedure, which may include computer computation, is also provided whereby lateral motion of the bottom hole assembly, while drilling, is estimated based on longitudinal and torsional acceleration measurements made at the top of the drillstring.

In accordance with a further aspect of the present invention, there is provided a method for predicting when a bottom hole assembly of a drillstring will undergo deflection or forward synchronous whirl for a particular condition of weight on bit and drillstring rotational frequency or speed. In the method described, consideration is given to certain conditions in the wellbore such as the properties of the drilling fluid, the flow rate of the drilling fluid and the physical characteristics of the formation. These properties are usually lumped together as a single factor in the methodology.

In accordance with still further aspects of the present invention, methods are provided for determining the critical rotational speeds of a particular bottom hole assembly, the degree of shortening of the bottom hole assembly due to lateral bending or deflection thereof and the degree of shortening of the drillstring at the surface as a result of the shortening or deflection of the bottom hole assembly.

Still further important aspects of the present invention, together with other superior features thereof, will be realized by those skilled in the art upon reading the detailed description which follows in conjunction with the drawing.

DESCRIPTION OF PREFERRED EMBODIMENTS

In the description which follows, like features are marked with the same reference numerals throughout the specification and drawing, respectively. The drawing figures are not to scale and are shown in schematic form in the interest of clarity and conciseness.

Figure 1:
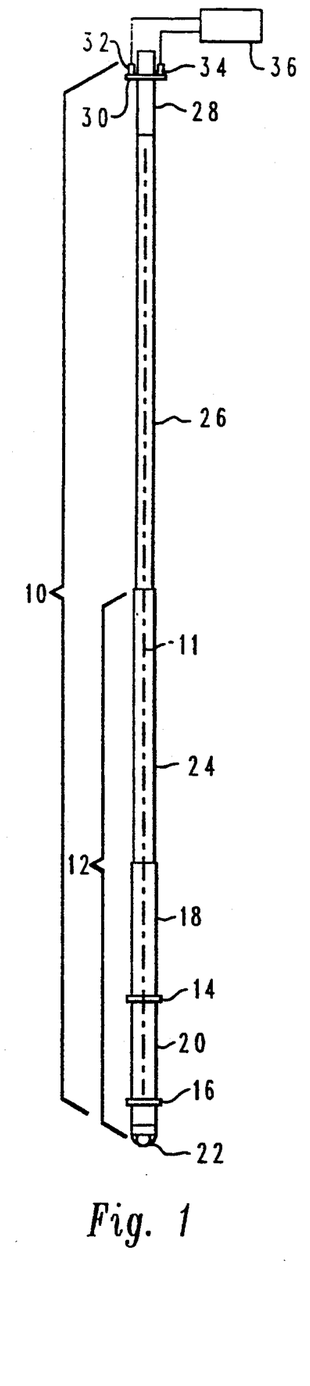
FIG. 1 is a diagram in somewhat schematic form of a drillstring showing the basic elements which are analyzed in accordance with the present invention.

FIG. 1 is a diagram of a drillstring of the type used in drilling oil and gas wells, for example. The entire drill string illustrated is designated by the numeral 10 and is shown in a manner which will create a better mental impression of the features of the various parts of the drillstring and is not an accurate scale drawing of the drillstring. Conventional drillstrings, such as the drillstring 10, are typically made up of a bottom hole assembly 12 comprising at least two spaced apart stabilizers 14 and 16, which may be of known types, and a series of elongated pipe sections which are relatively heavy and are known in the art as drill collars 18 and 20. The bottom of the drillstring 10 includes a conventional bit 22 for engaging and grinding or breaking off pieces of rock and earth to be conveyed up through an annular area between the drillstring and the wellbore or borehole being formed, not shown.

Conventional drillstrings also include a section of so-called heavy weight drill pipe comprising part of the bottom hole assembly and designated by the numeral 24 in FIG. 1. Lastly, and in accordance with the method of the present invention, there is provided an upper portion of the drillstring comprising conventional drillpipe designated by the numeral 26 in FIG. 1. The very uppermost end of the drillstring 10 is provided with means for recording accelerations of the drillstring, generally in accordance with the teachings of U.S. Pat. No. 4,715,451, and comprising a sub 28 having an annular flange 30 formed thereon. The sub 28 includes suitable acceleration or strain or sensors 32 and 34 disposed on the flange 30 or otherwise on the sub and capable of generating signals which are analyzed by a receiving, recording and control apparatus 36 which may also be generally in accordance with the teaching of the aforementioned patent. The sensors 32 and 34 may, for example be triaxial accelerometers whose movements may be sensed to detect longitudinal motion of the drillstring 10 as well as torsional vibration or oscillatory motion of the drillstring while it is being rotated by a suitable drive mechanism such as a top drive device, not shown, or a conventional rotary table, also not shown.

In accordance with the method of the present invention it is assumed that the bottom hole assembly 12 will, at a rotational speed which corresponds to a lateral critical speed of the bottom hole assembly, undergo lateral deflection until it comes into contact with the wall of the wellbore being drilled by the drill stem. This lateral deflection will cause a "shortening" of the bottom hole assembly 12, including the section 24, which may be sensed by the sensors 32 and 34. It is also assumed that this lateral deflection will occur generally once in a single revolution of the drillstring 10 about its longitudinal central axis 11.

Figure 2:
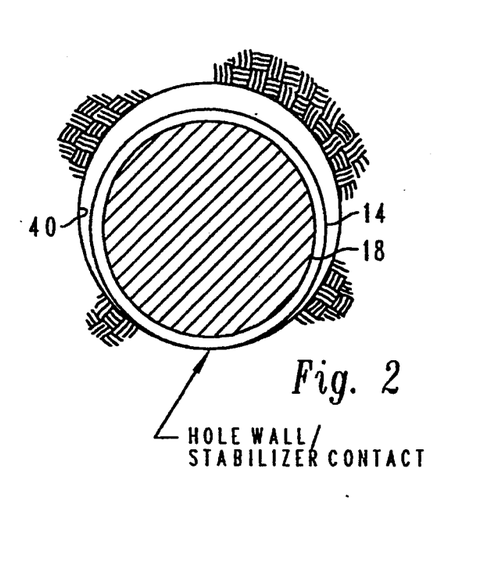
FIG. 2 is a diagram of the crossection of the bottom hole assembly in a typical borehole.

The present invention provides a method for determining, for a particular drillstring, what signals may indicate a potentially damaging lateral displacement of the bottom hole assembly 12 into contact with the wellbore or borehole wall 40, FIG. 2. In this regard, three basic determinations must be made. Firstly, for a particular bottom hole assembly configuration, lateral resonant critical frequencies are to be identified and the shape of the displacement of the bottom hole assembly or "mode shape" must be determined for a condition wherein forward resonant whirl is experienced. Secondly, the degree of longitudinal shortening or torsional deflection of the bottom hole assembly must be determined for the whirl condition assumed. Lastly, the degree of shortening or longitudinal deflection of the drillstring at the surface as well as torsional deflection must be determined so that this behavior can be compared to or correlated with signals derived from the sensors 32 and 34, for example.

As previously mentioned, it is assumed that a condition will exist wherein the bottom hole assembly will be displaced with respect to the longitudinal central axis 11 in such a way that a portion of the bottom hole assembly will contact the borehole wall. It is also assumed that in normal drilling operations, that contact will be established between the borehole wall 40, see FIG. 2, by one or the other of the stabilizers 14 or 16. Under this condition, the maximum displacement between the drill collar 18 and the borehole wall 40 may be the difference in diameters between the drill collar 18, for example, and the borehole minus one-half of the difference between the diameter of the drill collar and the stabilizer 14.

Figure 3:
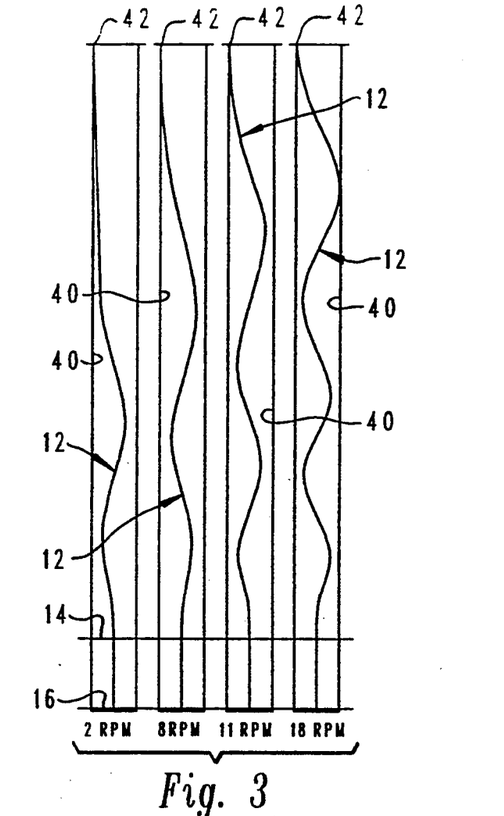
FIG. 3 is a diagram illustrating typical mode shapes of vibration of a bottom hole assembly.

In order to determine the longitudinal shortening of the drillstring 10, it is necessary to determine the critical speeds and the particular mode shape, of the bottom hole assembly 12 when it is undergoing lateral deflection due to having reached a critical frequency or forward synchronous whirling condition. FIG. 3, for example, illustrates typical mode shapes for a bottom hole assembly 12 at four critical speeds. In all instances the point of contact with the borehole wall 40 is essentially at the top of the bottom hole assembly as indicated by the numeral 42. The lines 14 and 16 in FIG. 3 indicate the locations of the stabilizers relative to the overall length of the bottom hole assembly, which is typical of a conventional drillstring.

Figure 4:
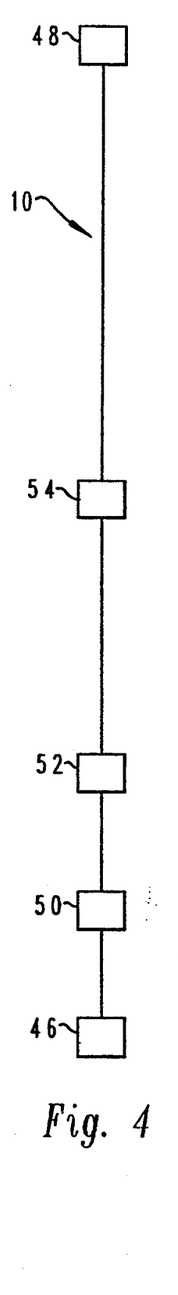
FIG. 4 is a diagram illustrating the equivalent lumped mass configuration assumed for the drillstring.

In order to determine the critical frequency and the mode shape of the bottom hole assembly that results in contact of the borehole wall, in accordance with the method of the invention the bottom hole assembly and the drillstring are preferably characterized as discreet masses concentrated at selected points along the elastic beam column which comprises the drillstring. The drillstring is further characterized by weightless beam sections between the concentrated masses. FIG. 4 illustrates a typical example and is intended to be viewed in conjunction with FIG. 1. For purposes of calculating the critical frequency, the mode shape and the shortening of the bottom hole assembly in accordance with the method of the present invention, it is reasonable to assume that the mass of the drill bit 22 and half of the bottom drill collar 20 may be lumped at a mass 46 in FIG. 4. At the other end of the drillstring 10 the surface mass 48 usually should contain the mass of any structure attached to the drillstring such as a swivel and traveling block, not shown. The lumped masses in between the top and bottom masses 46 and 48 may be determined by a procedure wherein, for example, the mass 50 is determined by combining half of the weight of the next section such as the drill collar 18 with half of the weight of the drill collar 20 and so on until the total weight of the drillstring is allocated to the masses 46, 48, 50, 52, 54 and so on. The number of degrees of freedom in the elastic beam column represented in FIG. 4 for each of the masses is twice the number of masses, since each mass has a lateral and a rotational degree of freedom.

The determination of critical rotational speed or frequency $\omega$ and the mode shape of the bottom hole assembly 12, for example, may be determined from solving the eigenvalue problem.

$$[K] \times [X] = \omega^2 \times [M] \times [X]$$

The solution to this eigenvalue problem is the desired result for free, undamped vibrations. The eigenvalues, $\omega$, and the corresponding eigen vectors [X] are the natural frequencies and the mode shapes, respectively.

When, for each computation, the matrices [K] and [M] have been constructed, a computer program may be used such as that described in "Numerical Recipes", Fortran Version, Cambridge University Press 1989, Chapter 11, by William H. Press, et al. The essential feature for such a program is that it works for [K] and [M] as they are both real, symmetric, matrices, [M] is positive definite and [K] is positive semi-definite. Such a program may be used to solve computations for lateral, torsional and longitudinal vibration of the bottom hole assembly 12.

Figure 5:
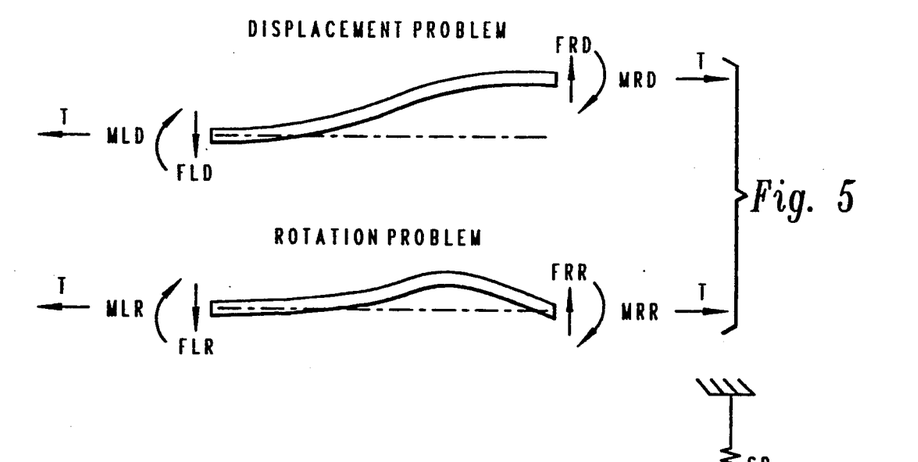
FIG. 5 is a diagram of the forces acting on an element of the drillstring.

The terms in the spring matrix [K] are based on the results of elementary beam column problems. To obtain the term in the Ith row and Jth column in the spring matrix, it is necessary to find the force or moment on the Jth degree of freedom owing to a displacement (or rotation) of one unit of the Ith degree of freedom. The forces and moments for this problem are in static equilibrium and all displacements and rotations have the value zero excepting the Ith displacement (or rotation). In the case of a beam column there are two distinct problems whose solutions permit calculations of all of the elements of the spring matrix. The solutions to these problems are described below and are mathematically different when the value for T, see FIGS. 5, is positive (tension) and when T is negative (compression). The forces (F) and moments (M) acting on the left (L) and right (R) ends of the rod in the displacement (D) and rotational (R) modes are indicated in FIG. 5 by the respective three letter designations. Additionally, numerical problems arise when either solution is used for very small values of |T|. The three distinct loading cases which may be used in conjunction with solving the matrices are distinguished by the sign of T and the size of $\alpha$ where:

$$\alpha = \sqrt{|T|/EI}$$

where EI is the bending stiffness of the beam-column. The solutions are given in terms of the beam-column length, L, as Case 1, $\alpha^*L \leq 0.1$
  $FLD = FRD = 12^*EI/L^3$
  $MLD = MRD = FLR = FRR = 6^*EI/L^2$
  $MLR = 2^*EI/L$
  $MRR = 4^*EI/L$ Case 2, $\alpha^*L > 0.1, T > 0$ (tension)
  Let
    $SH = \sinh(\alpha^*L)$
    $CH = \cosh(\alpha^*L)$
    $DETP = +\alpha^*L^*SH - 2^*(CH-1)$
  then
    $FLD = FRD = EI^*\alpha^3{}^*SH/DETP$
    $MLD = MRD = FLR = FRR = EI^*\alpha^2{}^*(CH-1)/DETP$
    $MLR = EI^*\alpha^*(SH-\alpha^*L)/DETP$
    $MRR = EI^*\alpha^*(\alpha^*L^*CH-SH)/DETP$ Case 3, $\alpha^*L > 0.1, T < 0$ (compression)
  Let
    $S = \sin(\alpha^*L)$
    $C = \cos(\alpha^*L)$
    $DETN = -\alpha^*L^*S - 2^*(C-1)$
    $FLD = FRD = EI^*\alpha^3{}^*S/DETN$
    $MLD = MRD = FLR = FRR = EI^*\alpha^2{}^*(1-C)/DETN$
    $MLR = EI^*\alpha^*(\alpha^*L-S)/DETN$
    $MRR = EI^*\alpha^*(S-\alpha^*L^*C)/DETN$ When the mass matrix, [M], is determined it is necessary to increase the mass of the BHA/drillstring assigned to each station by the added mass. This correction may be written as:

Adjusted Mass = Mass + CM*(mass of displaced fluid)
  The coefficient, CM, depends on two parameters which are S and $\beta$ where
    $S = \omega^*DO^2/(4^*\nu)$
    $\beta = DH/DO$
  and where
    $\omega$ = circular frequency of rotation, radians/sec.

DO = diameter of BHA/drill string, ft.
DH = diameter of hole, ft.
$\nu$ = kinematic viscosity of mud, ft. 2/sec.

Figure 6:
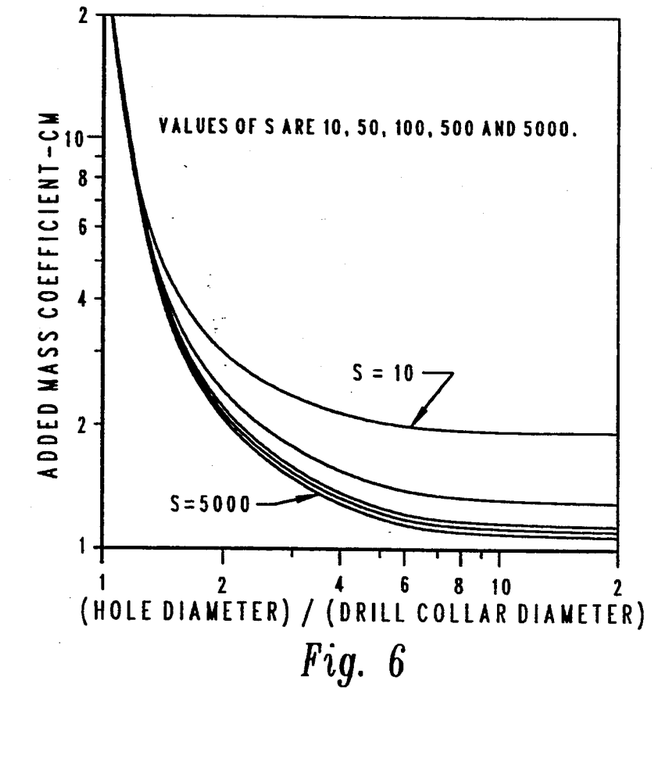
FIG. 6 is a diagram of certain parameters used in the method of the invention.

Values of CM may be obtained from FIG. 6 also for a practical range of interest.

In the solution to the torsional vibration problem for a single rod with concentrated masses the system may be defined by:

(N) = mass moment of inertia of Kth mass. In general, the position in the string of I(N) lies between the positions of I(N−1) and I(N+1). N=1→NEND KT(N) = torsional spring constant for the rod between inertias N and N+1. N=1→NEND−1 and the boundary conditions. Away from the boundaries the spring matrix, [K], has three non-vanishing elements for the Jth row which are:

K(J,J) = KT(J−1) + KT(J)
K(J,J−1) = -KT(J−1)
K(J,J+1) = -KT(J)

The mass matrix is diagonal with the Jth diagonal term equalling I(J).

The above-mentioned procedures may be used to determine mode shapes and corresponding lateral critical speeds for a particular bottom hole assembly. Since it has been determined that it is plausible to expect longitudinal vibrations at the top of the drillstring which result from forward synchronous whirling of the bottom hole assembly at one of its lateral critical speeds, such vibrations can be correlated with an identified lateral critical speed which would correspond to the rotational speed of the drillstring.

In order to determine the shortening of the bottom hole assembly for a critical speed, the corresponding mode shape is determined from the above-described procedure by modelling the bottom hole assembly or "BHA" as the afore-described lumped mass system and solving the associated eigenvalue problem. The determination of the bottom hole assembly shortening from the computed mode shape requires a unique procedure which is described hereinbelow. In order to apply the bottom hole assembly shortening to the longitudinal vibration prediction at the top of the drillstring, a second method is used which is also described hereinbelow.

For a particular mode shape corresponding to a lateral critical speed in which forward whirling occurs, the mode shape is described from the lumped mass model of the systems with stations along the bottom hole assembly. Let the Ith station be located at the position x(I). The total number of stations is denoted by ITOT. The mode shape description is given by specifying x(I), y(I) and $\theta$(I) for I=1, ..., ITOT where y(I) is the lateral displacement at the Ith station and $\theta$(I) is the rotation at the Ith station.

The calculation procedure presented in this section does not use the values of $\theta$(I) in the determination of shortening so the data to be used is x(I) and y(I) for I−1, ..., ITOT. The salient point for the method described below is that the BHA is divided into sections and an approximation for y(x) is developed for use in the shortening calculation for that section. The BHA shortening is, of course, found as the sum of the shortenings of all of its sections.

This procedure takes advantage of the simply supported nodes enforced by the stabilizers as well as the nodes occurring between the stabilizers. The configuration of the mode shapes between adjacent nodes is assumed to be well approximated by a half sine wave. At the BHA end sections (between one of the ends and the nearest node) a more complicated shape must be assumed in order to approximate the mode shape. For these sections a linear combination of a half sine wave and a straight line segment is used.

Consider first the interior of the BHA (away from the end sections). Successive BHA nodes may be found by interpolation for zero crossings from y(i) and x(I). This implies that between successive nodes there is, at least, one station with a non-trivial lateral displacement. The parts of the BHA which have been divided by this means are referred to here as sections. A half sine wave is used to approximate the BHA lateral displacement for each interior section. The amplitude of the half sine wave is adjusted to minimize the sum of the squares of the errors between the sine wave and the mode shape lateral displacements between the nodes. Let N = number of modal lateral displacements between nodes, at least one.

L = distance along the BHA axis between the successive nodes under consideration.

x = coordinate along BHA axis between the two successive nodes. The origin for x is at one of the nodes.

x(i) = position (value of x) of ith station in the section. i=1, ... N y(i) = lateral displacement of ith stations in the section. i=1, ... N The assumed displacement, y(x), in the section is $$y(x) = A \sin(\pi x/L)$$

The error, E(i), for the ith station is $$E(i) = y(i) - A \sin(\pi x(i)/L)$$

The function, ERROR, to be minimized is given by $$\text{ERROR} = \sum_{i=1}^{N} E(i)^2$$

Setting the derivative of ERROR with respect to A equal to zero yields $$A = \left[ \sum_{i=1}^{N} y(i) \sin(\pi x(i)/L) \right] / \left[ \sum_{i=1}^{N} \sin^2(\pi x(i)/L) \right]$$

Once A has been found the approximation to the shortening, SHORT, for this section is $$\text{SHORT} = 0.5 \int_0^L y'(x)^2 \, dx = (\pi A/2)^2/L$$

The above procedure is followed for each interior section of the BHA.

Consider next an end section of the BHA. The lateral displacements of the mode shape are not necessarily zero at the ends. Consequently one end of these sections is a node while the other end may have a non-trivial lateral displacement.

For an end section consider first the case where the origin for the x coordinate is at the nodal end of the section. The assumed lateral displacement function should vanish at the origin. Therefore, the function is chosen according to the number of nodal stations in the end section. When there is one station choose the lateral displacement function for the section as:

$$y(x) = B\,x$$

Let the single station location be defined as x(1) and the corresponding lateral displacement be defined by y(1). Then $$B = y(1)/x(1)$$

Let the length of the end section be L. The shortening, SHORT, for this section is given by $$\text{SHORT} = 0.5 \int_0^L y'(x)^2\,dx = B^2 L/2$$

When the nodal end of the end section is chosen to be at x=L and there is a single data point from the modal lateral displacements in the section, the later displacement function is assumed to be $$y = B\,(L-X)$$

With the single station defined as before by x(1) and y(1), the value of B is given by $$B = y(1)/(L - x(1))$$

and the shortening becomes $$\text{SHORT} = 0.5 \int_0^L y'(x)^2\,dx = B^2 L/2$$

Now consider an end section of length L with the nodal end at the origin for the x coordinate and with N (>1) stations in the section. In this case assume the lateral displacement function is $$y(x) = A\,\sin(\pi x/L) + B\,x$$

Let the position and amount of the nodal lateral displacements be defined, as before, as x(i) and y(i), i=1, . . , N, so that the error, E(i), for the Ith stations is $$E(i) = y(i) - A\,\sin(\pi x(i)/L) - B\,x(i)$$

Define ERROR as before and minimize this function with respect to both A and B to obtain the two simultaneous equations, $$a11\,A + a12\,B = b1$$

$$a12\,A + a22\,B = b2$$

where $$a11 = \sum_{i=1}^{N} \sin^2(\pi x(i)/L)$$

$$a12 = \sum_{i=1}^{N} x(i)\,\sin(\pi x(i)/L)$$

$$a22 = \sum_{i=1}^{N} x(i)^2$$

-continued $$b1 = \sum_{i=1}^{N} y(i)\,\sin(\pi x(i)/L)$$

$$b2 = \sum_{i=1}^{N} y(i) \times (i)$$

When the values of A and B have been found using the above equations, the shortening, SHORT, may be found as $$\text{SHORT} = 0.5 \int_0^L y'(x)^2\,dx = (\pi A/2)^2/L + B^2 L/2$$

When, for the case immediately above, the nodal end of the section is chosen to be at X=L, the later displacement function is $$y(x) = A\,\sin(\pi x/L) + B(L - x)$$

Using the same procedures as above, the solution for A and B is obtained from the simultaneous equations $$a11\,A + a12\,B = b1$$

$$a12\,A + a22\,B = b2$$

where $$a11 = \sum_{i=1}^{N} \sin^2(\pi x(i)/L)$$

$$a12 = \sum_{i=1}^{N} (L - x(i))\,\sin(\pi x(i)/L)$$

$$a22 = \sum_{i=1}^{N} (L - x(i))^2$$

$$b1 = \sum_{i=1}^{N} y(i)\,\sin(\pi x(i)/L)$$

$$b2 = \sum_{i=1}^{N} y(i)\,(L - x(i))$$

The shortening can then be found from $$\text{SHORT} = 0.5 \int_0^L y'(x)^2\,dx = (\pi A/2)^2/L + B^2 L/2$$

The above procedures are applied to the BHA so that a value of SHORT is found for every section. The sum of all these values of SHORT gives the total shortening of the BHA for the specified mode shape. The above derivations show that the total shortening is proportional to the square of the amplitude of the mode shape. Consequently the change in length of the BHA for a monotonic change in the mode shape amplitude is proportional to the change in the difference of the squares of the maximum and minimum values of the absolute value of the mode shape amplitude during the mode shape amplitude change.

The method will now be described which is used to convert the calculation for shortening of the BHA into a force system on the entire drillstring which may be used to subsequently predict the axial motion at the top of the drillstring. The axial motion of the drillstring resulting from axial force excitation is then found using a method to be described further herein. Consequently, the equivalent axial force system derived here must be compatible with the mechanical model of the drillstring.

Figure 7:
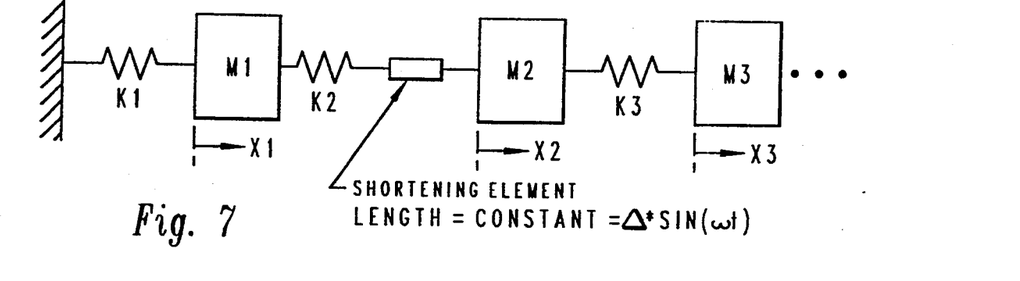
FIGS. 7 and 8 are diagrams of an equivalent lumped mass, spring system for the drillstring.

Consider a lumped mass, spring system based on the schematic diagram of FIG. 7. The three dots imply a continuation of lumped mass spring elements following the same pattern as K3, M3, and X3. The shortening element is in series with the spring K2. Its mechanical characteristic is given in the figure. The length variation, $\Delta \sin(\omega t)$, tends to extend and compress the spring K2 and thus forces are developed within the system. The combination of the spring K2 and the shortening element represent the BHA assembly. The spring K2 represents the axial stiffness of the BHA while the shortening element is intended to account for the shortening of the BHA during its whirling at the lateral critical speed. The motion is simplified to be sinusoidal at the lateral critical speed.

Figure 8:
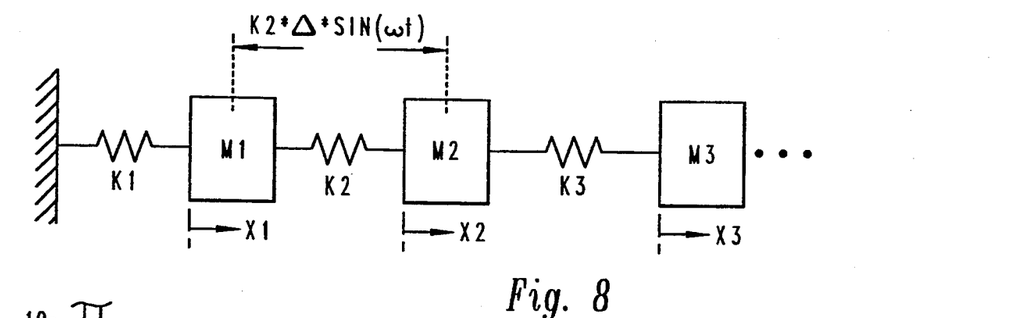

The dynamic equations of motion for the system containing the shortening element are as follows,
M1 $X1_{,tt} = -K1\ X1 + K2\ (X2 - X1 - \Delta\sin(\omega t))$
M2 $X2_{,tt} = -K2\ (X2 - X1 - \Delta\sin(\omega t)) + K3\ (X3 - X2)$
M3 $X3_{,tt} = -K3\ (X3 - X2) \ldots$ where the subscripted double t implies the second derivative with respect to time. These equations may be rewritten in the form
M1 $X1_{,tt} + (K1 + K2)X1 - K2\ X2 = -K2\ \Delta\sin(\omega t)$
M2 $X2_{,tt} - K2\ X1 + (K2 + K3)X2 - K3\ X3 = +K2\ \Delta\sin(\omega t)$
M3 $X3_{,tt} - K3\ X2 + (K3 + \ldots)X2 - \ldots = 0$ This last set of equations is easily seen to be the same as the set governing the problem shown in FIG. 8 where the shortening element is replaced by two opposing forces on the masses M1 and M2 adjacent to the shortening element. Consequently, the motions of the masses are the same in the two systems.

Figure 9:
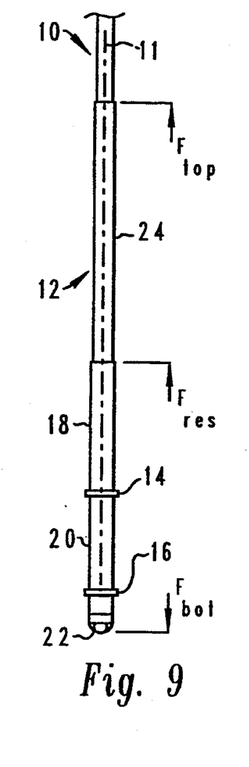
FIG. 9 is a diagram illustrating resultant axial forces acting on the drillstring.

The BHA may be separated into two parts for the shortening computation. Conceptually, the bottom part consists of drill collars while the top part consists of heavyweight drill pipe. The shortening is calculated separately for each part. In addition, each part has its own axial stiffness designated as KT and KB for the top and bottom parts of the BHA, respectively. Let the shortening of the top and bottom parts be approximated by SHT $\sin(\omega t)$ and SHB $\sin(\omega t)$. FIG. 9 shows the equivalent forcing system which is applied to the BHA to compute the axial motions at the top of the drillstring owing to shortening. FIG. 9 shows that three forces result;

$F_{top} = KT*SHT*SIN(\omega t)$, $F_{bot} = KB*SHB*SIN(\omega t)$
and the resultant force,
$F_{res} = (KB*SHB - KT*SHT)*SIN(\omega t)$.

Frequently, the longitudinal attachment of the bottom of the BHA (at the bit) is modeled to be built in. In that case, the lowest force in FIG. 9 goes directly to the rigid case, that is, the formation is assumed rigid compared to the string, and causes no motion of the drillstring.

A computer program can be used to model the entire drillstring and solve for the motion at the top of the drillstring for each of the three forces, one at a time. The resulting motions can be summed to find the net top motion of the drillstring.

Figure 10:
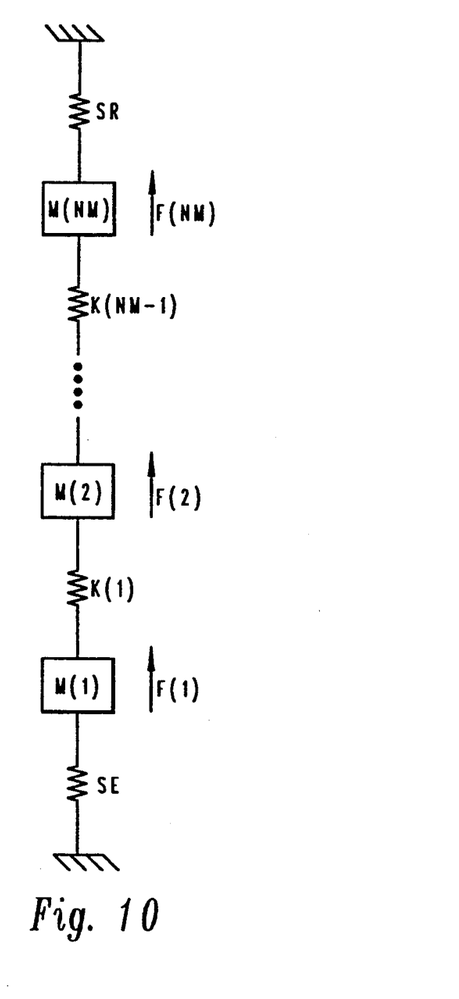
FIG. 10 is another diagram of an equivalent lumped mass spring system.

The prediction of the once-per-revolution response at the top of the drillstring owing to the once-per-revolution shortening determined by the aforementioned method and the forces created thereby may be determined by applying the values of forces in a set of governing equations for the lumped mass model for the drillstring as previously described. The matrix formulation of the equations is described herein together with the matrix solution techniques. Referring also to FIG. 10, the number of rigid body masses is (NM), and the equations of motion for an undamped system can be written as $$M(1)*X(1)_{,tt} + (SE + K(1))*X(1) - K(1)*X(2) = F(1)$$

$$M(I)*X(I)_{,tt} + (K(I) + K(I+1))*X(I) - K(I)*X(I-1) - K(I+1)*X(I+1) = F(I) \text{ for } I = 2 \rightarrow NM - 1$$

$$M(NM)*X(NM)_{,tt} + (SR + K(NM-1))*X(NM) - K(NM-1)*X(NM-1) = F(NM)$$

where

X(I) = displacement of Ith rigid body, a function of time, t, and subscripted t implies differentiation with respect to time.

F(X) = external force applied to Ith rigid body, a function of time.

K(X) = axial spring constant between the Ith and I + 1st masses.

SE = axial spring constant between ground and 1st mass.

SR = axial spring constant between NMth mass and ground.

The above set of equations can be written in matrix form as $$M \cdot X_{,tt} + K \cdot X = F$$

where
X = displacement vector
= an NM size, single column matrix. The Ith element is X(I)
M = mass array
= an NM size, square, diagonal matrix. The Ith diagonal element is M(I)
K = spring array
= an NM size, square, symmetric, tridiagonal matrix. The I,J element is the coefficient of X(J) in the Ith equation of motion.
F = force vector
= an NM size, single column matrix. The Ith element is F(I)

When linear, viscous damping is present in the system, the equations of motion take the form $$M \cdot X_{,tt} + C \cdot X_{,t} + K \cdot X = F$$

where

C = damping array
= an NM size, square, symmetric matrix to be discussed herein.

Once a model is established, the upper frequency limit for validity of the drillstring model may be estimated using the lowest value, KMIN, of the spring constants, K(I), and the largest value, MMAX, of the rigid body masses, M(I), using frequency limit $\approx \sqrt{KMIN/MMAX}/(4*\pi)$ The matrixes described above have properties which permit the use of numerical techniques according to the following process:

$$K \cdot X = \Omega^2 \cdot M \cdot X$$

has NM vector solutions which are real and the corresponding eigenvalues are all nonnegative. The solutions are specified in the following form:

$$\Omega(I), \alpha(J,I) \text{ where } I,J = 1 \rightarrow NM$$

where
I = index for Ith solution
$\Omega(I)$ = I-th eigenvalue
= the I-th undamped natural frequency for the system
$\alpha(J,I)$ = value of the J-th displacement in the I-th solution and
let $\alpha$ = modal array
= the NM size, square matrix whose J-th row and I-th column element is $\alpha(J,I)$. This matrix is nonsingular.

$\Omega^2$ = frequency array
= an NM size, square, diagonal matrix whose I-th diagonal term is the square of the I-th natural frequency $I$ = identity array
= an NM size, square, diagonal matrix all of whose diagonal elements are equal to 1.

In this work it is assumed that the solutions are ordered so that $$\Omega(I+1) > \Omega(I) \text{ where } I = 1, -, NM - 1$$

and that the solutions are scaled so that the first orthogonality condition becomes $$\alpha^T \cdot M \cdot \alpha = I$$

The modal matrix satisfying this condition is an orthonormal modal matrix. In this case the second orthogonality condition becomes:

$$\alpha^T \cdot K \cdot \alpha = \Omega^2$$

Now return to the governing equations in the form $$M \cdot X_{,tt} + C \cdot X_{,t} + K \cdot X = F$$

and change the dependent variables from the displacements, X(I) to the modal amplitudes $\phi(I)$ using $$X = \alpha \cdot \phi$$

where $\phi$ = normal coordinates vector
= an NM size, single column matrix whose I-th element is the size factor $\phi(I)$ for the I-th solution.

Introduce the change of variables into the governing equations and premultiply the result by the transpose of the modal matrix. The two orthogonality conditions can be applied to the resulting matrix equation to obtain $$\phi_{,tt} + \alpha^T \cdot C \cdot \alpha \cdot \phi_{,t} + \Omega^2 \phi = \alpha^T \cdot F$$

The matrix containing the damping matrix will not, in general, be diagonal. This matrix will be assumed to be diagonal with its I-th diagonal element equal to the (I-th natural frequency)/Q. Q is the magnification factor at resonance which is assumed to be equal for all modes. With these assumptions the governing equations uncouple so that, $$\phi(I)_{,tt} + (\Omega(I)/Q) \cdot \phi(I)_{,t} + \Omega(I)^2 \cdot \phi(I) = \Sigma \alpha(J,I) \cdot F(J)$$

where the summation sign implies summation over all NM modes. The homogeneous solution for this equation when Q is greater than one half is $$\phi(I)_{homo} = e^{-\kappa(I) \cdot t} \cdot (C1(I) \cdot \cos(Q(I) \cdot t) + C2(I) \cdot \sin(-Q(I) \cdot t))$$

where
$\kappa(I) = \Omega(I)/(2 \cdot Q)$
$Q(I) = \Omega(I) \cdot (1 - 1/(2 \cdot Q)^2)^{\frac{1}{2}}$ C1(I) and C2(I) are constants of integration. The particular solution to the above governing equations depends upon the problem being solved. The above equations are the starting point for the solutions presented below. One further result is used in the solutions below and that is $$\phi^{-1} \phi^T \cdot M$$

which follows from the first orthogonality condition.

A steady state response problem and a steady state frequency problem may both be solved from the above governing equations. Digital computer programs may be prepared to solve the equations stated above. The programs are logically divided into two parts. The first part constructs the mass and spring matrices and finds the solution to the eigenvalue problem. The second part solves the response problems.

For this problem, the station (NE) which receives a force excitation (F(NE)) which varies sinusoidally with time is specified. The steady state solution is found for the displacement X(NR). The steady state solution in this case is simply the particular solution. The forces are:

F(NE) = FAMP*sin ($\omega$t)
F(I) = 0 for all I (1→NM) except NE
for all time where
FAMP = force amplitude at excited station and
$\omega$ = circular frequency of excitation
With this forcing function the steady state solution is given by $$X(NR) = (AS^2 + AC^2)^{\frac{1}{2}} \cdot \sin(\omega \cdot t - \arctan(AS/AC))$$

where
$A(I) = \alpha(NR,I) \cdot \alpha(NE,I) \cdot FAMP/((Q(I)^2 - \omega^2)^2 + (\omega \cdot Q(I)/Q)^2)^{\frac{1}{2}}$ $\theta(I) = \arctan(\omega^*Q(I)/(Q^*(Q(I)^2 - \omega^2)))$
$AC = \Sigma A(I)^*\cos(\theta(I))$
$AS = \Sigma A(I)^*\sin(\theta(I))$ and the summation is taken over all of the modes and amplitude phase. It may be desirable to determine the ratio of the amplitude of the displacement, acceleration or force response to the amplitude of the exciting force for selected frequencies. The relative phase angle, PH, between the two motions is also found for each of the selected frequencies. The solution to the steady state response condition can be used to deduce that for the displacement ratio:

$ATOT = (AS^2 + AC^2)^{\frac{1}{2}}$
$PH = \arctan (AS/AC)$

A torsional impulse signal may also be imparted through the drillstring 10 and sensed by the sensors 32 and 34, or similar sensors, to confirm the once-per-revolution synchronous whirling of the bottom hole assembly. Accordingly, by sensing a torsional impulse which corresponds to the speed of rotation at a lateral critical speed confirmation of bottom hole assembly whirling may be obtained.

It is reasonable to assume that there is impact between the hole wall and the drill collar during forward whirl at lateral critical speeds of the BHA. This impact has a strong once per revolution component because of the assumed mean eccentricity of the BHA centerline to the hole axis. This impact reverses the radial velocity of the excited mode shape owing to the assumed idealized impulsive action. The drill collar mode shape also receives a torsional impulse at the same time it undergoes radial impact. The tangential force developing the torsional impulse is assumed to equal a coefficient of friction times the radial impulsive force. The torsional impulse causes a torsional stress wave to initiate in the BHA. This stress wave, including its repetition each revolution may be used to predict what dynamic, torsional signals arrive at the top of the drillstring.

The following gives details for developing an estimate of the torsional response at the top of the drillstring, the determination of the torsional excitation at the BHA, the procedure for solving torsional vibration problems, and the method used to convert the single torsional impulse response of the drillstring to the steady state response.

The method used to estimate the torsional impulse strength involves the following assumptions:

For each BHA lateral critical resonance in the operating speed range assume the rotating speed equals the critical speed and that the BHA dynamic response is a forward whirl which contains only the corresponding mode shape for the critical speed. Assume the location for radial impact occurs at the location of the largest mode shape lateral displacement.

The radial clearance for the development of radial velocity for impact is denoted DHS where

DHS = (HOLE DIAMETER) − (STABILIZER DIAMETER)

Let the critical speed, in radians per second, be OMEGA(I) for the I-th resonance. An estimate of the impact velocity for this mode, VELIM(I), is assumed to be

VELIM(I) = OMEGA(I)*DHS

The radial momentum of the mode at impact is assumed equal to the sum of the products of the masses and lateral velocities along the BHA when the maximum velocity is equal to VELIM(I). The modal station with the largest lateral displacement has the velocity VELIM while the remaining lateral velocities are proportional to the local mode shape lateral displacements. The rotational momentum associated with the lateral mode shape is neglected in the calculation. The resulting radial momentum is designated as RMOMENTUM (I). The change of momentum, RIMPULSE (I), which occurs at impact is found as

RIMPULSE (I) = (1.+(COEFFICIENT OF RESTITUTION))*RMOMENTUM (I)

The torsional impulse, TIMPULSE (I), is determined from the radial impulse, RIMPULSE (I), by

TIMPULSE (I) = (COEFFICIENT OF FRICTION)*(DRILL COLLAR DIAMETER)

*(RIMPULSE (I))/2

Consequently, for each BHA lateral critical speed in the operating speed range there is a corresponding torsional impulse. In order to accomplish the above steps the appropriate BHA lateral mode shapes and natural frequencies (critical speeds) are required.

The torsional motion at the top of the drillstring may be determined using generally the aforementioned procedure for determining longitudinal motion if the parameters indicated below are used.

| Longitudinal Motion | Torsional Motion |
|---|---|
| Displacement, in. | Angle, rad. |
| Weight, lb. | (Weight) *((Radius of Gyration)$^2$, lb.-sq.in. |
| Young's Modulus, psi. | (Shear Modulus) *((OD)$^2$ + (ID)$^2$)/8, lb |
| Force, lb. | Torque, lb.-in. |
| Velocity, in./sec. | Angular Velocity, rad./sec |
| Acceleration, in./sq. sec | Angular Acceleration, rad./sq.sec. |
| Linear Spring Constant, lb./in. | Torsional Spring Constant, lb.-in./rad. |

The assumption of a once per revolution excitation at a lateral critical speed OMEGA makes possible a formulation of the steady state torsional response SS(t) with period 2*π/(OMEGA) as follows:

$$SS(t) = \text{TIMPULSE} * \sum_{J=1}^{\infty} UI(t + (J-1)*2*\pi/(\text{OMEGA})),$$

$$0 < t < 2*\pi/(\text{OMEGA}).$$

where TIMPULSE is the amplitude of the torsional impulse.

Figure 11:
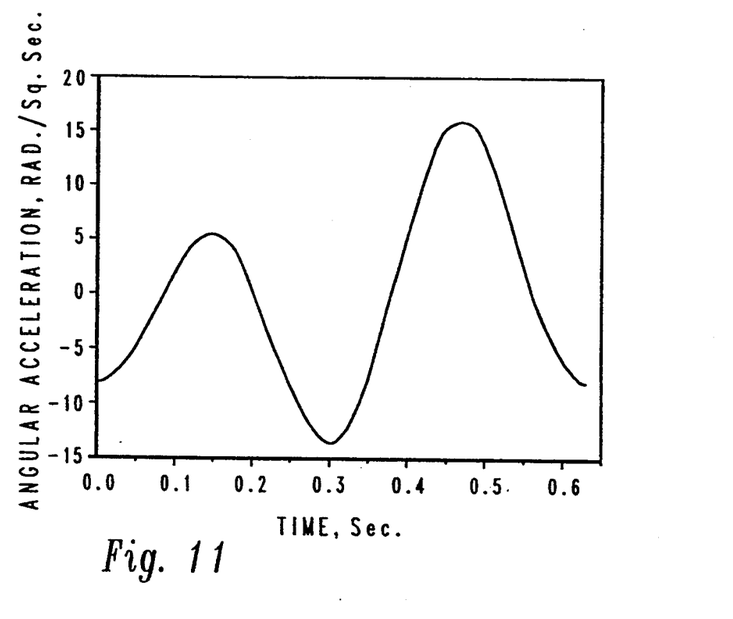
FIG. 11 is a diagram showing the resultant torsional acceleration of the drillstring.

FIG. 11 illustrates the angular acceleration characteristic calculated as a function of time using the sensors 32 and/or 34, (FIG. 1), for example, for a steady state condition of operation of the drillstring 10. The signal characteristic indicated in FIG. 10 may be subjected to Fourier analysis to provide acceleration amplitude as a function of frequency. Peak values would be expected at multiples of the lateral critical speed of the bottom hole assembly 12 resulting from impacting of the borehole wall by the bottom hole assembly.

Although a preferred method for confirming the occurrence of synchronous whirling and other behaviors of the bottom hole assembly of the drillstring has been described herein, those skilled in the art will recognize that various substitutions and modifications may be made to the methods described without departing from the scope and spirit of the invention as recited in the appended claims.

What is claimed is:

1. A method for determining the occurrence of impacting of at least a portion of an elongated drillstring with a wellbore wall during rotation of said drillstring comprising the steps of:
   placing sensor means on said drillstring during rotation of drillstring and at a predetermined point in relation to said portion of said drillstring;
   determining at least one lateral critical speed of said portion of said drillstring;
   estimating the impact velocity of said portion of said drillstring against said wellbore wall;
   determining a torsional impulse imparted to said portion of said drillstring resulting from said impacting of said portion of said drillstring with said wellbore wall from the equation:

TIMPULSE (I) = (COEFFICIENT OF FRICTION) * (DRILL STRING DIAMETER) * RIMPULSE (I)/2 wherein RIMPULSE is the change in momentum of the portion of the drillstring which impacts said wellbore wall based on the coefficient of restitution of said portion of said drillstring and its radial momentum;
   determining the torsional motion at said predetermined point on said drillstring resulting from said torsional impulse; and
   comparing said torsional motion of said drillstring resulting from said torsional impulse with torsional motion of said drillstring at said predetermined point derived from measurements with said sensor means.

2. The method set forth in claim 1 wherein:
   said torsional impulse is determined by estimating the impact velocity of said portion of said drillstring against said wellbore wall.

3. A method of operating a rotary drillstring to avoid lateral displacement of at least a portion of said drillstring, such as a bottom hole assembly, which will result in contact with the wellbore wall, comprising the steps of:
   determining at least one critical rotational speed of said portion of said drillstring which will produce said lateral displacement based on selected ones of the physical features of said portion of said drillstring including the length of said portion of said drillstring including characterizing the drillstring as a plurality of discrete masses concentrated at selected points along the drillstring and interconnected by weightless beam sections between the concentrated masses;
   determining the mode shape of said lateral displacement of said portion of said drillstring at said critical speed; and
   rotating said drillstring at a rotational speed other than said critical speed, wherein said portion of said drillstring includes said bottom hole assembly comprising a bit connected to one end of a first member and a second member connected to said first member at the opposite end of said first member and the mass of said bit and half of the mass of said first member are lumped together as at least one discrete mass.

4. The method set forth in claim 3 wherein:
   a second mass is determined by combining the mass of half of the first member with the mass of half of the second member.

5. The method set forth in claim 3 wherein:
   the step of determining the mode shape includes the steps of characterizing the displacement of said portion of said drillstring as plural incremental displacements of at least one of a half sine wave and a combination of a half sine wave and a straight line segment.

6. The method set forth in claim 3 including the steps of:
   placing sensor means in contact with said drillstring for measuring at least one of longitudinal and torsional vibrations of said drillstring during rotation thereof;
   determining the instantaneous change in length of said drillstring which would result from said lateral displacement of said portion of said drillstring; and
   comparing said instantaneous change in length of said drillstring with displacement of said drillstring derived from measurements with said sensor means.

7. A method for determining the occurrence of impacting of at least a portion of an elongated drillstring with a wellbore wall during rotation of said drillstring comprising the steps of:
   placing a sensor means on said drillstring during rotation of drillstring and at a predetermined point in relation to said portion of said drillstring;
   determining at least one lateral critical speed of said portion of said drillstring;
   determining a torsional impulse imparted to said portion of said drillstring resulting from said impacting of said portion of said drillstring with said wellbore wall;
   determining the torsional motion at said predetermined point on said drillstring resulting from said torsional impulse based on the weight of said drillstring, the shear modulus of the material of said drillstring, said torsional impulse, and the torsional spring constant of said drillstring; and
   comparing said torsional motion of said drillstring resulting from said torsional impulse with torsional motion of said drillstring at said predetermined point derived from measurements with said sensor means.

8. The method set forth in claim 7 including the step of:
   determining the angular acceleration of said drillstring at said predetermined point as a function of time using said sensor means; and
   transferring said angular acceleration to indicate the amplitude of said angular acceleration as a function of frequency to determine if a peak amplitude of angular acceleration is occurring at a lateral critical speed of said drillstring.

9. A method of operating a rotary drillstring to avoid lateral displacement of at least a portion of said drillstring, such as a bottom hole assembly, which will result in contact with the wellbore wall, comprising the steps of:
   determining at least one critical rotational speed of said portion of said drillstring which will produce said lateral displacement based on selected ones of the physical features of said portion of said drillstring including the length of said portion of said drillstring;

characterizing said drillstring as a plurality of discrete masses concentrated at selected points along the drillstring and interconnected by weightless beam sections between the concentrated masses;

deriving an adjusted mass for each of said concentrated masses based on a coefficient which has a value related to the diameter of said portion of said drillstring, the diameter of the wellbore, the speed of rotation of the drillstring, and the kinematic viscosity of fluid in the wellbore;

determining the mode shape of said lateral displacement of said portion of said drillstring at said critical speed; and rotating said drillstring at a rotational speed other than said critical speed.

* * * * *